United States Patent [19]

Torney

[11] Patent Number: 4,771,907

[45] Date of Patent: Sep. 20, 1988

[54] FOOD STORAGE CONTAINER

[76] Inventor: Christopher Torney, 211 Kent Ave., Kentfield, Calif. 94904

[21] Appl. No.: 139,381

[22] Filed: Dec. 30, 1987

[51] Int. Cl.$^4$ .............................................. B62D 21/00
[52] U.S. Cl. .............................. 220/23.83; 220/23.86; 220/467
[58] Field of Search .................. 220/23.83, 23.86, 467, 220/3.1, DIG. 18

[56] References Cited

U.S. PATENT DOCUMENTS

| | | | |
|---|---|---|---|
| 705,551 | 7/1902 | Bauers | 220/23.83 |
| 1,326,114 | 12/1919 | Sullivan | 220/23.83 |
| 2,138,560 | 11/1938 | Stuart | 220/23.83 |
| 3,269,789 | 8/1966 | Crowe | 220/467 X |
| 3,589,554 | 6/1971 | Smith | 220/23.83 |
| 3,856,178 | 12/1974 | Norgaard | 220/23.83 |
| 3,940,195 | 2/1976 | Tillman | 220/467 X |

*Primary Examiner*—Steven M. Pollard
*Attorney, Agent, or Firm*—Larry D. Johnson

[57] ABSTRACT

A food storage container provides an insulated box member having a plurality of walls defining an internal cavity, and at least one wall being hinged or otherwise movable to enable access to the interior. The box is conditioned to carry a plurality of internal, modular storage bin members of various shapes and capacities. The storage bins include protruding edge portions that fit within integral side sleeves formed in the interior walls of the box to secure the storage bins in a particular position. The heights of the bins are generally equal to the distance between the side sleeves, or some multiple thereof, to enable versatility in combining the bins within the box. A separate bin lid member may be inserted over each bin member to cover the bin contents, and may itself be secured in place by a similar protruding edge portion similarly insertable within the interior wall side sleeves.

3 Claims, 3 Drawing Sheets

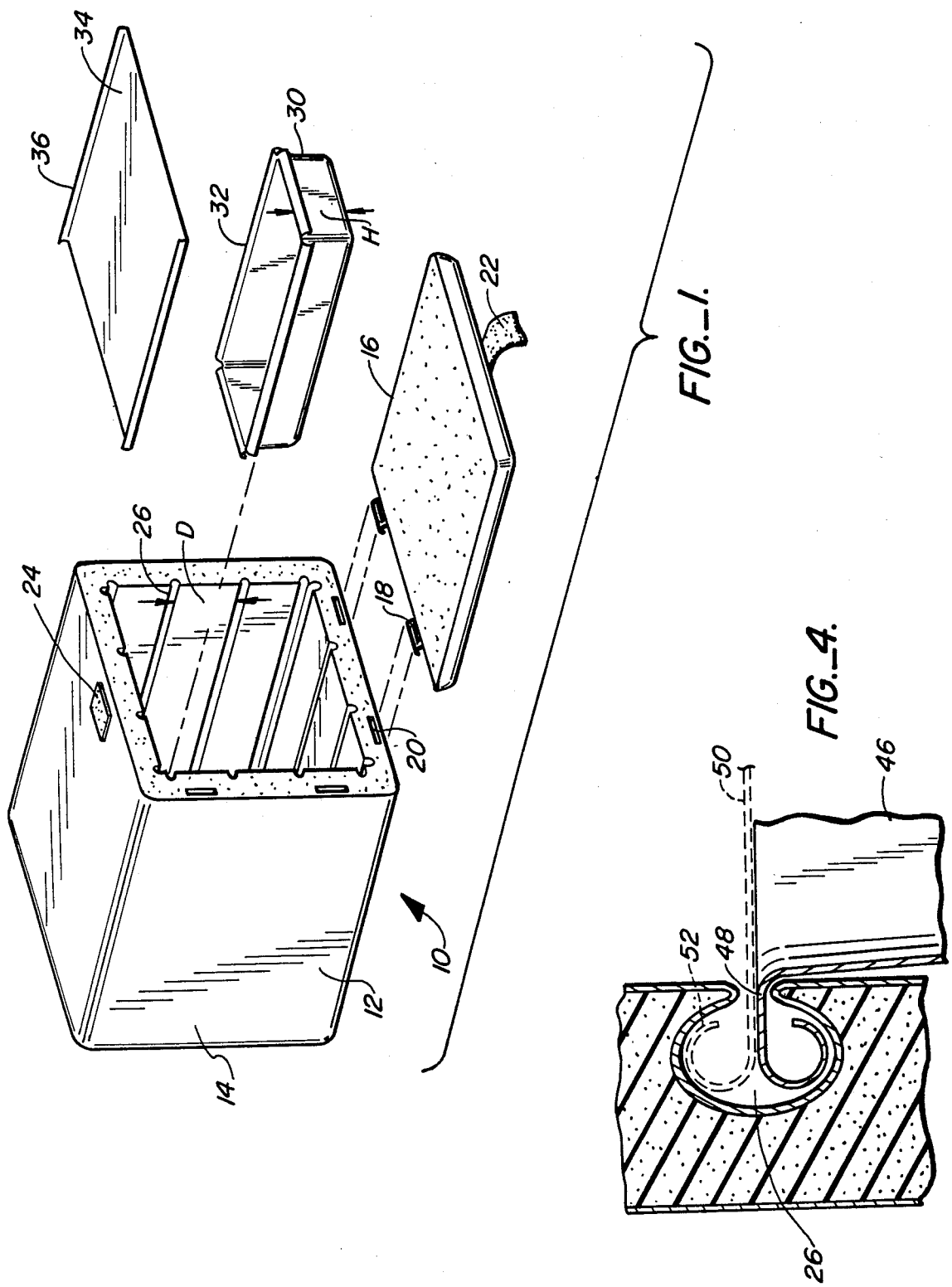

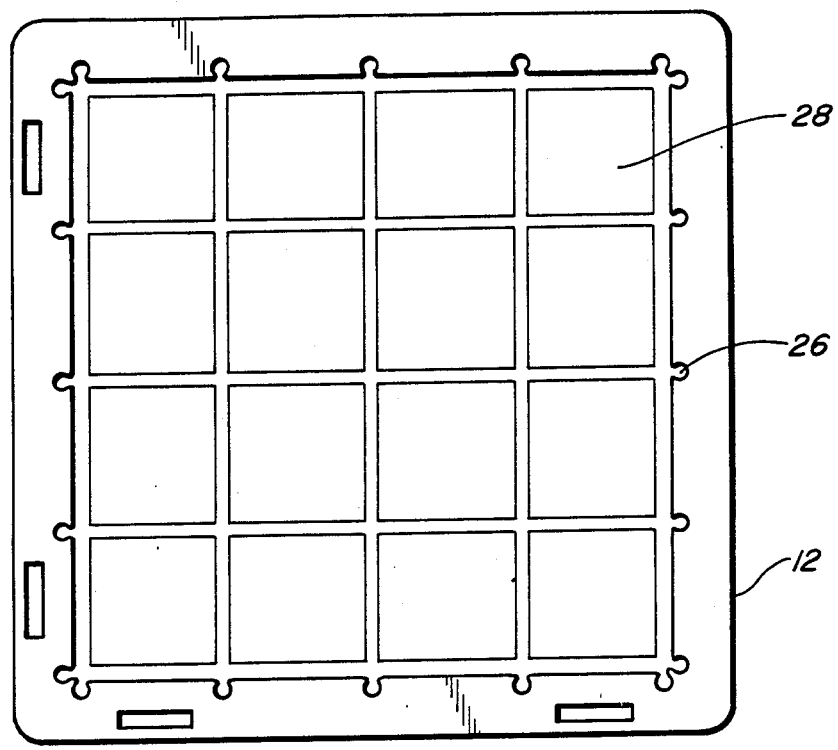
FIG._2.
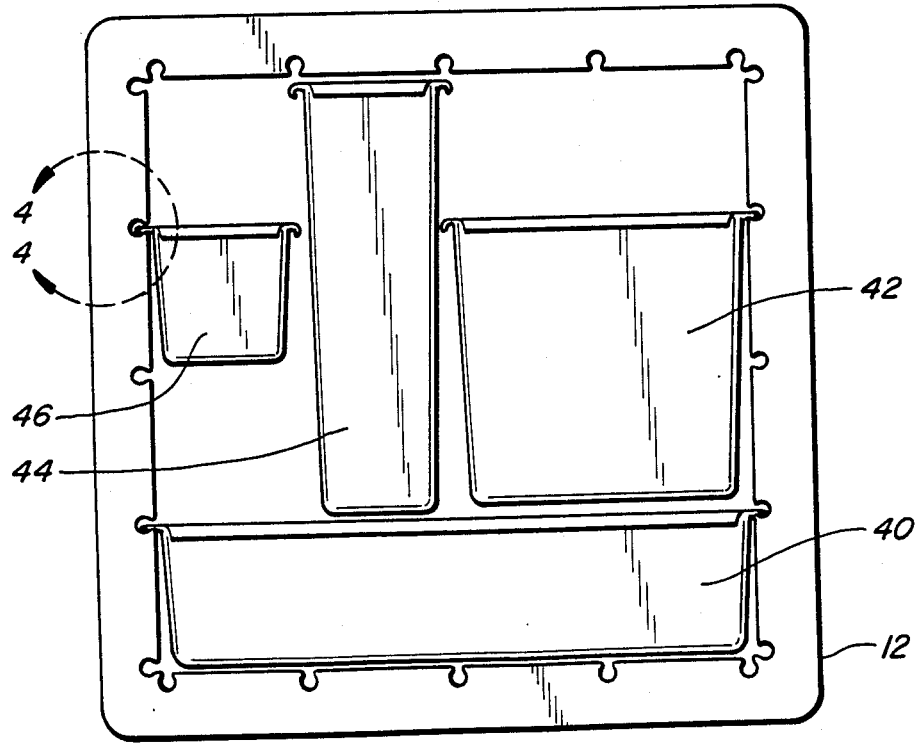
FIG._3.

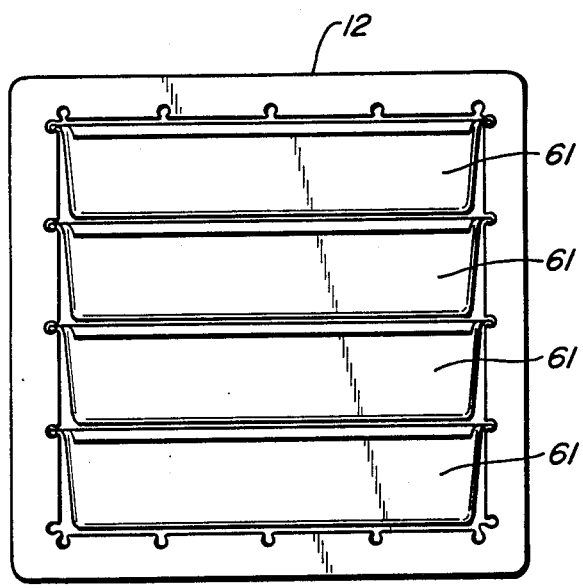
FIG._5.
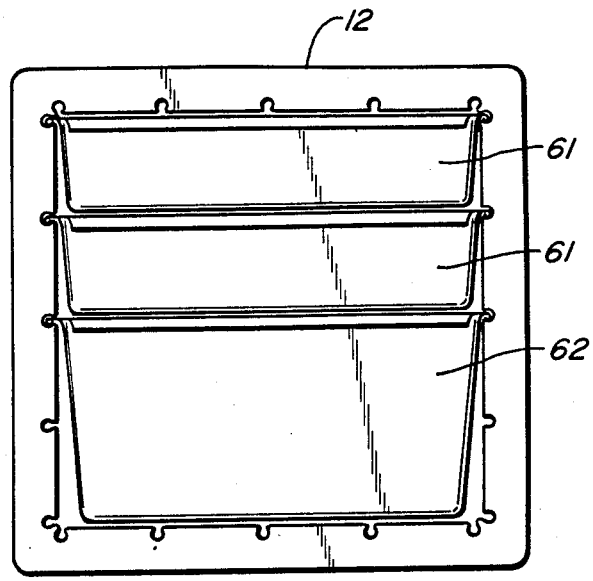
FIG._6.
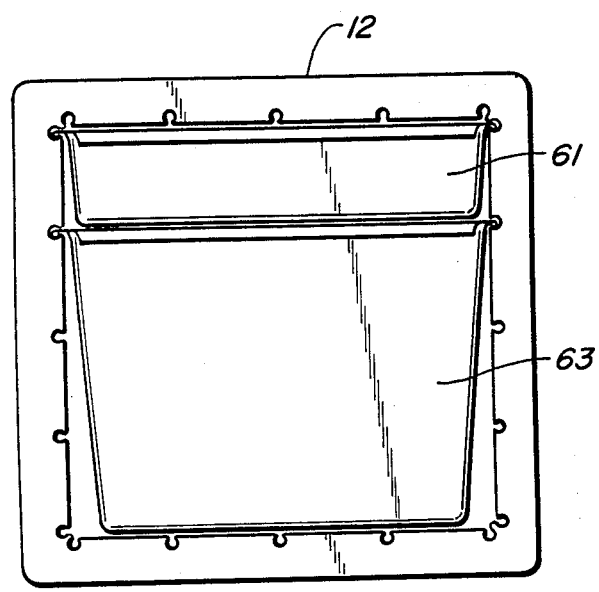
FIG._7.
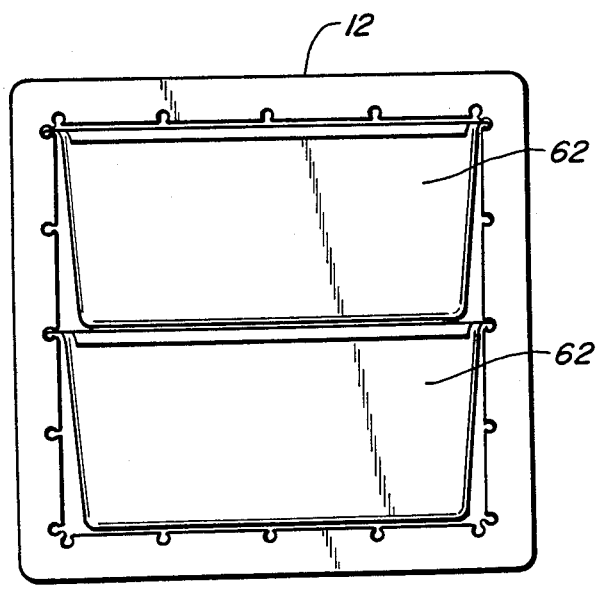
FIG._8.

FOOD STORAGE CONTAINER

BACKGROUND OF THE INVENTION

1. Field of the Invention

This invention relates generally to boxes and other containers, and more specifically to an improved container for food transport and storage.

2. Description of the Prior Art

Numerous boxes, chests, and other containers for food have been developed. Most are simply six-walled boxes with the top "wall" hinged for access to the interior storage area. Such boxes may be insulated for improved thermal protection, and may include a carrying handle or strap for ease in transport. In addition, some such boxes accommodate a thermos or other separate container within the box itself, or may be compartmentalized by partitions to separate various foods or portions. However, most known food containers are extremely limited in their ability to store and transport a variety of shapes and sizes of food, or of different-sized internal storage units.

SUMMARY OF THE INVENTION

The food storage container of this invention provides an insulated box member having a plurality of walls defining an internal cavity, and at least one wall being hinged or otherwise movable as a door to enable access to the interior. The box is conditioned to carry a plurality of internal, modular storage bin members of various shapes and capacities. These modular storage bins include protruding edge or flange portions that engage integral side sleeves or tracks formed in the interior walls of the box to secure the storage bins in a particular position in the box. The heights of the bins are preferably generally equal to the distance between the side sleeves, or some multiple thereof, to enable versatility in combining the bins within the box. A separate bin lid member may be inserted over each bin member to cover the bin contents, and may itself be secured in place by a similar protruding edge or flange portion similarly insertable within the interior wall side sleeves.

BRIEF DESCRIPTION OF THE DRAWINGS

FIG. 1 is an exploded perspective view of a food storage container of this invention, illustrating the relationship between the insulated box, removable door, internal modular storage bin, and lid;

FIG. 2 is an elevated front view of the insulated box portion of the food storage container, illustrating the integral side sleeves and waffle back;

FIG. 3 is an elevated front view of the insulated box of the food storage container with a variety of internal modular storage bins contained therein, in one possible lay-out arrangement;

FIG. 4 is a vertical cross-sectional view of the region of line 4—4 of FIG. 3, illustrating the engagement of the storage bin flange portion and box integral side sleeve; and FIGS. 5-8 are a series of elevated front views of the insulated box, illustrating the storage permutations of different heights of full-width internal modular storage bins;

FIG. 5 illustrates a combination of four single-height modular storage bins;

FIG. 6 illustrates a combination of one double-height plus two single-height modular storage bins;

FIG. 7 illustrates a combination of one triple-height plus one single-height modular storage bins; and FIG. 8 illustrates a combination of two double-height modular storage bins.

DETAILED DESCRIPTION OF A PREFERRED EMBODIMENT

FIG. 1 is an exploded perspective view of a food storage container 10 of this invention. Container 10 comprises a clad or otherwise insulated box member 12 having a plurality of walls 14 defining an interior space. A removable door 16 is attachable to the box by hinge member 18 engageable within hinge receiver 20, which may be located on adjacent walls so the hinge may be placed to enable the door to open from the side or top. The door may be secured to the box by means of a latch 22 and latch fastener 24. The interior surfaces of the box walls include integral side sleeve or track portions 26, which are generally parallel to one another and separated by a common distance D. An internal, modular storage bin 30 is insertable within the box so that its protruding edge or flange 32 is engageable within sleeve 26 and, since the sleeves are located on each wall's interior surface, the bin can be inserted in either orientation. The height H of the bin is preferably generally equal to or a multiple of the distance D between the sleeves. A bin lid 34 may also be inserted within the box to cover a particular bin, and bears a lid flange 36 which is similarly engageable within sleeve 26.

FIG. 2 is an elevated front view of the insulated box 12 of the food storage container. In this view, the integral side sleeves 26 are seen to be coextant with similar sleeves in a waffle back 28. Such an arrangement serves to provide structural support and improved divisibility of the container.

FIG. 3 is an elevated front view of the insulated box 12 of the food storage container with a variety of internal modular storage bins contained therein, in one possible lay-out arrangement. For example, modular storage bin 40 provides a single height, full-width bin. Bin 42 defines a double height, half-width bin, while bin 44 defines a triple height, quarterwidth bin, and bin 46 defines a single height, quarter-width bin.

FIG. 4 is a vertical cross-sectional view of the region of line 4—4 of FIG. 3, illustrating the engagement of the storage bin flange 48 and box integral side sleeve 26. Lid 50, shown here in phantom, is similarly engageable within sleeve 26 via its lid flange 52.

FIGS. 5-8 are a series of elevated front views of the insulated box 12, illustrating the storage permutations of different heights of full-width internal modular storage bins. FIG. 5 illustrates a combination of four single-height modular storage bins 61, FIG. 6 illustrates a combination of one double-height bin 62 plus two single-height bins 61, FIG. 7 illustrates a combination of one triple-height bin 63 plus one single-height bin 61, and FIG. 8 illustrates a combination of two double-height bins 62. In this case, the bin heights are all multiples of a "lowest common denominator" height. Thus, the wide range of permutations and variety of storage bins achieves an extremely versatile food storage container.

While this invention has been described in connection with preferred embodiments thereof, it is obvious that modifications and changes therein may be made by those skilled in the art to which it pertains without departing from the spirit and scope of the invention.

Accordingly, the scope of this invention is to be limited only by the appended claims.

What is claimed as invention is:

1. A food storage container comprising:
    an insulated box member having top, bottom, right, left, back and front wall portions defining an interior space, each of said wall portions having an inside surface, and said front wall portion providing a door being hingedly connected to said box member to enable access to said interior;
    integral sleeve portions defining tracks in said top, bottom, right and left wall inside surfaces, said sleeves being generally parallel to one another and separated by a first distance; and
    a plurality of storage bin members each having a bottom, right, left, back and front side, said right and left sides including flange portions conditioned for sliding engagement with said wall integral sleeve portions, said bin members each having a height dimension that is generally equal to some integer multiple of said first distance.

2. The food storage container of claim 1 wherein said front wall portion is connectable to and removable from at least two of said other wall portions, and is securable to said box member by a latch mechanism.

3. The food storage container of claim 1 wherein said back wall portion inside surface includes integral sleeve portions, and said storage bin members back and front sides each include flange portions conditioned for sliding engagement with said wall integral sleeve portions.

* * * * *